(12) United States Patent
Manahan et al.

(10) Patent No.: US 10,320,238 B2
(45) Date of Patent: Jun. 11, 2019

(54) INDUCTIVE POWER TRANSMISSION FOR ELECTRICAL DEVICES

(71) Applicants: Joseph Michael Manahan, Manlius, NY (US); Scott J. Bowen, Fabius, NY (US)

(72) Inventors: Joseph Michael Manahan, Manlius, NY (US); Scott J. Bowen, Fabius, NY (US)

(73) Assignee: EATON INTELLIGENT POWER LIMITED, Dublin (IE)

(*) Notice: Subject to any disclaimer, the term of this patent is extended or adjusted under 35 U.S.C. 154(b) by 175 days.

(21) Appl. No.: 15/262,662

(22) Filed: Sep. 12, 2016

(65) Prior Publication Data

US 2017/0004922 A1    Jan. 5, 2017

Related U.S. Application Data (62) Division of application No. 13/786,246, filed on Mar. 5, 2013, now Pat. No. 9,509,146.

(51) Int. Cl.
*H02J 50/12* (2016.01)
*H02J 50/40* (2016.01)
(Continued)

(52) U.S. Cl.
CPC .............. *H02J 50/12* (2016.02); *H01F 27/02* (2013.01); *H01F 38/14* (2013.01); *H02J 5/005* (2013.01); *H02J 50/40* (2016.02)

(58) Field of Classification Search
None
See application file for complete search history.

(56) References Cited

U.S. PATENT DOCUMENTS 5,580,163 A  12/1996  Johnson, II
6,120,164 A  9/2000  Libin et al.
(Continued)

FOREIGN PATENT DOCUMENTS

EP   1319889   6/2003
RU   2212727   9/2003
(Continued)

OTHER PUBLICATIONS

Chinese Office Action issued in Chinese patent application No. 201380054777.X, dated Jun. 2, 2017, 33 pages including translation, Chinese Patent Office.
(Continued)

*Primary Examiner* — Thienvu V Tran
*Assistant Examiner* — David M Stables
(74) *Attorney, Agent, or Firm* — King & Spalding LLP (57) ABSTRACT

An electrical system that includes an enclosure and a power source located outside the enclosure and generating a first current. The electrical system can also include a transmitting inductor located within the enclosure and electrically connected to the power source, where the first current generated by the power source flows through the transmitting inductor. The electrical system can further include a receiving inductor positioned proximate to the transmitting inductor within the enclosure, where the first current flowing through the transmitting inductor induces a second current to flow through the receiving inductor. The electrical system can also include a device located within the enclosure and electrically connected to the receiving inductor, wherein the second current induced in the receiving conductor powers the device.

20 Claims, 4 Drawing Sheets

(51) Int. Cl.
*H02J 5/00* (2016.01)
*H01F 27/02* (2006.01)
*H01F 38/14* (2006.01)

(56) References Cited

U.S. PATENT DOCUMENTS

| | | | |
|---|---|---|---|
| 6,585,395 | B2 | 7/2003 | Luk |
| 6,626,558 | B2 | 9/2003 | Momot et al. |
| 8,025,428 | B2 | 9/2011 | Duguay et al. |
| 8,841,834 | B2 | 9/2014 | Pickard |
| 2001/0053082 | A1 | 12/2001 | Chipalkatti et al. |
| 2003/0160684 | A1 | 8/2003 | Cern |
| 2005/0231945 | A1 | 10/2005 | Leibinger et al. |
| 2007/0147084 | A1 | 6/2007 | Lin |
| 2008/0025026 | A1 | 1/2008 | Lee et al. |
| 2009/0140665 | A1 | 6/2009 | Park |
| 2009/0303705 | A1 | 12/2009 | Waumans et al. |
| 2010/0216343 | A1* | 8/2010 | Buschnakowski ...... G01D 21/00 439/620.01 |
| 2011/0013420 | A1 | 1/2011 | Coleman |
| 2011/0080052 | A1 | 4/2011 | Sato |
| 2011/0095618 | A1 | 4/2011 | Schatz et al. |
| 2011/0130034 | A1* | 6/2011 | Montena ............ H01R 13/6683 439/578 |
| 2011/0317428 | A1 | 12/2011 | Paik et al. |
| 2012/0127713 | A1 | 5/2012 | Lee |
| 2012/0250296 | A1 | 10/2012 | Lu et al. |
| 2014/0185175 | A1 | 7/2014 | Murphy et al. |

FOREIGN PATENT DOCUMENTS

| | | |
|---|---|---|
| RU | 65286 | 7/2007 |
| RU | 2408476 | 1/2011 |
| TW | 200803956 | 1/2008 |
| WO | 2011136437 | 11/2011 |

OTHER PUBLICATIONS

E. Chukhlantseva, PCT/US2014/019472 International Search Report and Written Opinion, dated May 14, 2014, 12 pages, Russian International Searching Authority, Moscow, Russia.
Hye Lyun Park, PCT/US2013/029189 International Search Report and Written Opinion, Jun. 25, 2013, 11 pages, Korean International Searching Authority, Korea.
Machine translation of EP 1319889, via Lexisnexis Total Patent, 8 pages, Jun. 18, 2003.
Machine translation of RU 65286, via Lexisnexis Total Patent, 4 pages, Jul. 27, 2007.
Machine translation of RU 2212727, via Lexisnexis Total Patent, 4 pages, Sep. 20, 2003.
Machine translation of RU 2408476, via Lexisnexis Total Patent, 13 pages, Jan. 10, 2011.
Author unknown, Webpage Mimosa—lighting project—Philips describing Mimosa—Moving Flowers lighting project, Milan, Spring 2010, one page, retrieved from the Internet Mar. 25, 2014 at www.lighting.philips.com/main/projects/mimosa.wpd.
Chinese Office Action issued in Chinese patent application No. 201480012384.7, dated Nov. 14, 2016, 6 pages, Chinese Patent Office.
Translation of Chinese Office Action issued in Chinese patent application No. 201480012384.7, 3 pages.
Translation of TW200803956 via Lexsis Nexsis Total Patents, 9 pages.
Chinese Office Action issued in Chinese patent application No. 201380054777.X, dated Nov. 15, 2018, 13 pages including translation, Chinese Patent Office.
Examination Report issued in Canadian Examination Report dated Dec. 21, 2018, 4 pages.

* cited by examiner

INDUCTIVE POWER TRANSMISSION FOR ELECTRICAL DEVICES

CROSS-REFERENCE TO RELATED APPLICATIONS

This application is a divisional application of and claims the benefit of U.S. patent application Ser. No. 13/786,246, titled "Inductive Power Transmission For Electrical Devices" and filed on Mar. 5, 2013, the entire contents of which are hereby incorporated herein by reference. The present application is also related to U.S. patent application Ser. No. 13/786,223 (also U.S. Pat. No. 9,033,547), titled "Lighting Applications Using Organic Light Emitting Diodes".

TECHNICAL FIELD

Embodiments described herein relate generally to inductive power transmission, and more particularly to systems, methods, and devices for enabling inductive power transmission with electrical devices.

BACKGROUND

A number of electrical devices, particularly electrical devices used in commercial and industrial applications, receive power from sources through conductors. Specifically, conductors are electrically and mechanically coupled to a power source at one end and the electrical device at the other end. In such a case, a number of problems can arise at the connection point between the conductor and the electrical device. For example, the termination point between the conductor and the electrical device can overheat, causing damage to the conductor, the electrical device, and/or any nearby equipment.

A termination point between the conductor and the electrical device can overheat even more when the termination point becomes loose. Thermal cycling of the termination can cause the termination to loosen. In addition, or in the alternative, a loose termination point can be caused by one or more of a number of other factors, including but not limited to inadequate tightening and vibrations. Other conditions can also cause overheating of a termination. For example, corrosion of the termination can increase the contact resistance of the termination. As a result, the termination, even if tightly connected, can overheat. A loose termination point, corrosion, and/or other conditions that cause overheating can cause any of a number of fault conditions. For example, a loose termination can lead to arcing of electric current, which can lead to an explosion. If an explosion occurs, the safety of personnel and equipment can be compromised, even if the explosion occurs in an electrical enclosure.

SUMMARY

In general, in one aspect, the disclosure relates to an electrical system. The electrical system can include an enclosure, and a power source located outside the enclosure and generating a first current. The electrical system can also include a transmitting inductor located within the enclosure and electrically connected to the power source, where the first current generated by the power source flows through the transmitting inductor. The electrical system can further include a receiving inductor positioned proximate to the transmitting inductor within the enclosure, where the first current flowing through the transmitting inductor induces a second current to flow through the receiving inductor. The electrical system can also include a device located within the enclosure and electrically connected to the receiving inductor, where the second current induced in the receiving conductor powers the device.

In another aspect, the disclosure can generally relate to an inductive power source. The inductive power source can include a cable having a conductor disposed within an insulating member. The inductive power source can also include a housing disposed on an outer surface of the insulating member. The housing of the inductive power source can include a receiving inductor disposed within the housing, and an encroacher positioned on a bottom side of the housing and having a leading edge that penetrates the insulating member. The housing of the inductive power source can also include a coupling feature disposed on an outer surface of the housing. The inductive power source can further include a latch assembly movably coupled to the housing. The latch assembly can include an arm that extends from the housing, and a harness that couples to the insulating member of the cable. The latch assembly can also include a latch that mechanically couples to the coupling feature of the housing.

In yet another aspect, the disclosure can generally relate to an electrical connector having a first connector end and a second connector end mechanically coupled to the first connector end. The first connector end can include a first sleeve that forms a first cavity, and a first insulator disposed within the first cavity. The first connector end can also include at least one first conductor positioned within the first insulator, and at least one transmitting inductor coupled to a distal end of the at least one first conductor, where the at least one transmitting inductor is positioned proximate to a first open end of the first sleeve. The second connector end can include a second sleeve that forms a second cavity, and a second insulator disposed within the second cavity. The second connector end can also include at least one conductor positioned within the second insulator, and at least one receiving inductor coupled to a distal end of the at least one second conductor, where the at least one receiving inductor is positioned proximate to a second open end of the second sleeve. The first open end and the second open end can abut against each other when the first connector end is mechanically coupled to the second connector end.

These and other aspects, objects, features, and embodiments will be apparent from the following description and the appended claims.

BRIEF DESCRIPTION OF THE DRAWINGS

The drawings illustrate only exemplary embodiments of inductive power transmission and are therefore not to be considered limiting of its scope, as inductive power transmission may admit to other equally effective embodiments. The elements and features shown in the drawings are not necessarily to scale, emphasis instead being placed upon clearly illustrating the principles of the exemplary embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

The example embodiments discussed herein are directed to systems, apparatuses, and methods of inductive power transmission for electrical devices. The electrical devices (or more simply called "devices") can be any devices that can receive power from a power source through a conductor and use such power to operate. In certain example embodiments, the electrical devices are substantially fixed in a position and/or within an enclosure. Examples of electrical devices can include, but are not limited to, a lighting device, a motor starter switch, a breaker, a variable frequency drive (VFD), and a programmable logic controller (PLC). In some cases, a number of electrical devices can be electrically connected to each other in series and/or in parallel. Such electrical devices can be stand-alone or can be positioned within an electrical enclosure.

Such electrical devices may be required to follow certain standards and/or regulations that address safety and/or reliability issues. For example, if the electrical devices are positioned within a hazardous location enclosure, the National Electrical Manufacturers Association (NEMA) sets standards with which an enclosure must comply in order to qualify as an explosion-proof enclosure. Specifically, NEMA Type 7, Type 8, Type 9, and Type 10 enclosures set standards with which an explosion-proof enclosure within a hazardous location must comply. For example, a NEMA Type 7 standard applies to enclosures constructed for indoor use in certain hazardous locations. Hazardous locations may be defined by one or more of a number of authorities, including but not limited to the National Electric Code (e.g., Class 1, Division I) and Underwriters' Laboratories, Inc. (UL) (e.g., UL 1203). For example, a Class 1 hazardous area under the National Electric Code is an area in which flammable gases or vapors may be present in the air in sufficient quantities to be explosive.

As a specific example, NEMA standards for an explosion-proof enclosure of a certain size or range of sizes may require that in a Group B, Division 1 area, any flame path of an explosion-proof enclosure must be at least 1 inch long (continuous and without interruption), and the gap between the surfaces cannot exceed 0.0015 inches. Standards created and maintained by NEMA may be found at www.nema.org/stds and are hereby incorporated by reference. While this example embodiment of inductive power transmission is directed to an explosion-proof enclosure, example inductive power transmission systems can also be used for other types of enclosures, including but not limited to non-explosion-proof enclosures, conduits, light fixtures, and cables. Therefore, example inductive power transmission systems described herein should not be considered limited to explosion-proof enclosures.

Figure 1:
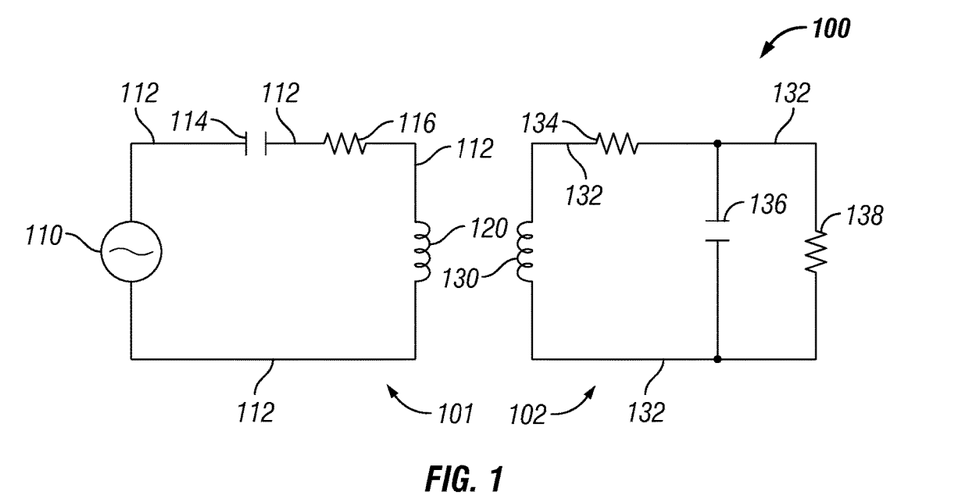
FIG. 1 shows a basic circuit for inductive power transmission.

FIG. 1 shows a basic circuit 100 for inductive power transmission. In one or more embodiments, one or more of the components shown in FIG. 1 may be omitted, repeated, and/or substituted. Accordingly, embodiments of inductive power transmission should not be considered limited to the specific arrangements of components shown in FIG. 1.

Referring to FIG. 1, the left half of the circuit 100 can be called the primary portion 101 of the inductive power transmission and can include a power source 110, a capacitor 114, a resistor 116, and an inductor 120. One or more of these components can be electrically connected to each other using one or more conductors 112. In this case, the power source 110, the capacitor 114, the resistor 116, and the inductor 120 are electrically connected to each other in series in a closed loop using the conductors 112.

In addition, or in the alternative, one or more of one or more other electrical components (e.g., a diode, a transistor) can be electrically connected, in series and/or in parallel, with one or more components of the primary portion 101 of the circuit 100. Alternatively, the primary portion 101 of the circuit 100 can include only the power source 110 electrically connected to the inductor 120 in series. In certain example embodiments, the primary portion 101 includes a number of inductors (e.g., inductor 120) that are electrically connected in series and/or in parallel with each other.

The right half of the circuit 100 can be called the secondary portion 102 and can include an inductor 130, one or more resistors (resistor 134, resistor 138), and a capacitor 136. In this case, the capacitor 136 and resistor 138 are electrically connected to each other in parallel, which is electrically connected in series with the inductor 130 and the resistor 134 using the conductors 132 to form a closed loop. As with the primary portion 101, the secondary portion 102 can be reconfigured with the components shown, components can be added, and/or components can be removed. In certain example embodiments, the resistor 138 is a load (e.g., a variable frequency drive (VFD), a motor) that has a resistive value.

When the primary portion 101 includes more than one inductor, then there can be at least one secondary portion 102 that is electromagnetically coupled to each inductor on the primary portion 101. An example of this is shown in FIGS. 2-3 below.

The current generated by the power source 110 flows through the inductor 120. When this occurs, the inductor 120 can act as the primary winding of a transformer or some other charge transfer device. In such a case, the inductor 120 receives a voltage and/or current and induces, using electromagnetism, a voltage and/or current in the inductor 130 of the secondary portion 102. The inductor 120 and/or the inductor 130 can include a number of windings made of an electrically conductive material (e.g., copper, aluminum), one or more solid state components (e.g., integrated gate-commutated thyristors, silicon controlled thyristors), one or more ancillary components (e.g., diodes), or any combination thereof. The combination of the inductor 120 and the inductor 130 can create AC-to-DC transformation (also called inversion), DC-to-AC transformation (also called conversion), AC-to-AC transformation, and DC-to-DC transformation.

The windings of the inductor 120 and the inductor 130 can have one or more ratios relative to each other. For example, the ratio between the winding in the inductor 120 and the winding in the inductor 130 can be 5:1, which would induce 24 VAC to be present at the inductor 130 on the secondary portion 102 based on 120 VAC being present at the inductor 120 on the primary portion 101. As another example, the ratio between the inductor 120 and the inductor 130 can be 10:1, which would induce 24 VAC to be present at the inductor 130 on the secondary portion 102 based on 240 VAC being present at the inductor 120 on the primary portion 101. In either example, the inductor 120 interacts with a power component (e.g., current, voltage), while the inductor 130 generates a power component, through induction, based on the power component in the inductor 120. The inductor 120 and/or the inductor 130 can have one or more settings that allow the ratio between the inductor 120 and the inductor 130 to vary, either according to input received from a user or from software instructions.

Figure 2:
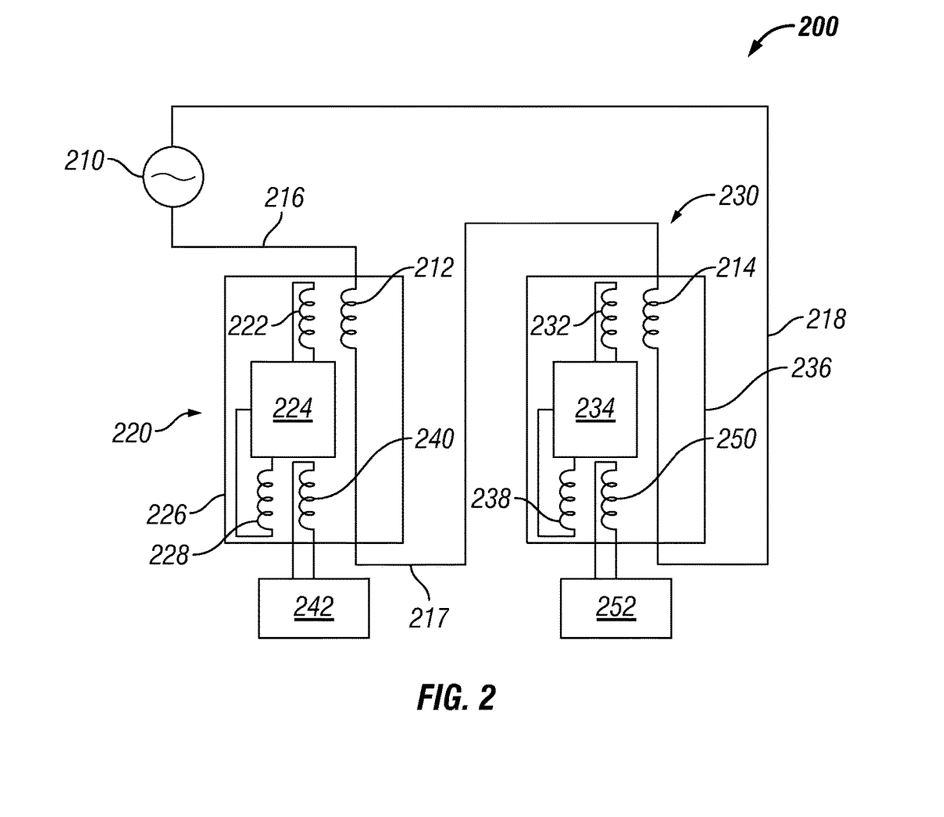
FIG. 2 shows a schematic view of a system of electrical devices within an electrical enclosure and receiving inductive power in accordance with certain example embodiments.
Figure 3:
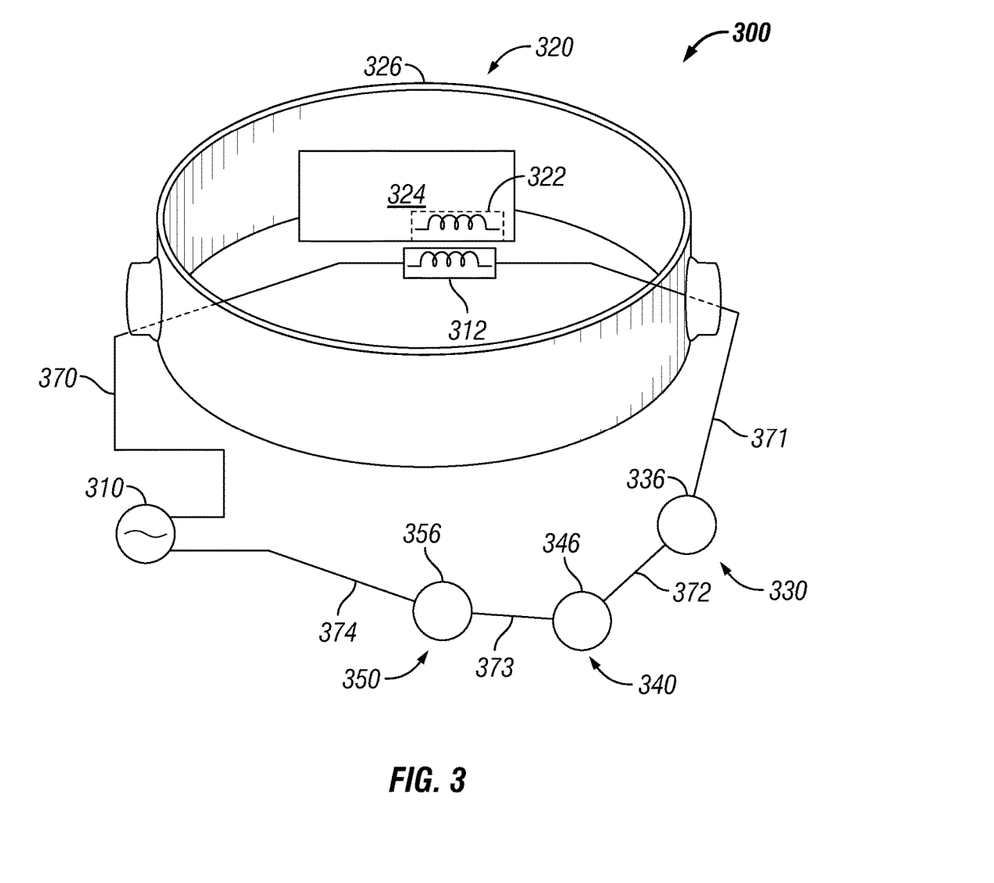
FIG. 3 shows a schematic view of a system of lighting devices receiving inductive power in accordance with certain example embodiments.

FIG. 2 shows a schematic view of a system 200 of that includes a power source 210 and two electrical systems 220, 230 that receive inductive power in accordance with certain example embodiments. In one or more embodiments, one or more of the components shown in FIG. 2 may be omitted, repeated, and/or substituted. Accordingly, embodiments of inductive power transmission should not be considered limited to the specific arrangements of components shown in FIG. 2. For example, a third enclosure could be electrically connected in series with the first enclosure 220 and the second enclosure 230.

Figure 4A:
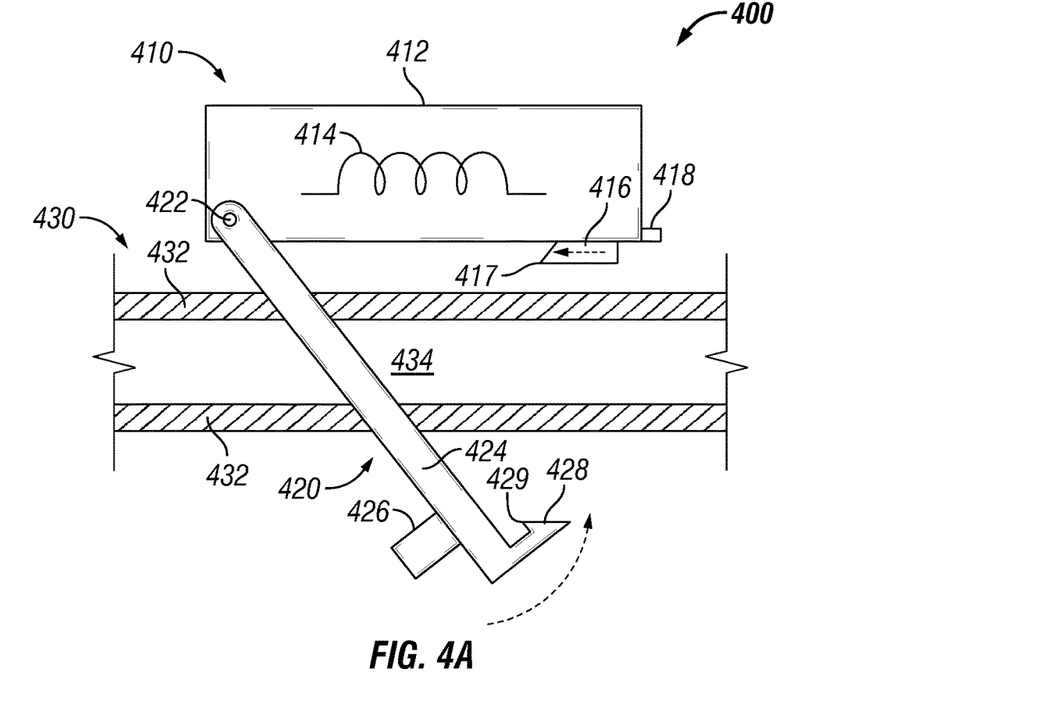
FIGS. 4A and 4B show various views of a system using an inductive device in accordance with certain example embodiments.
Figure 4B:
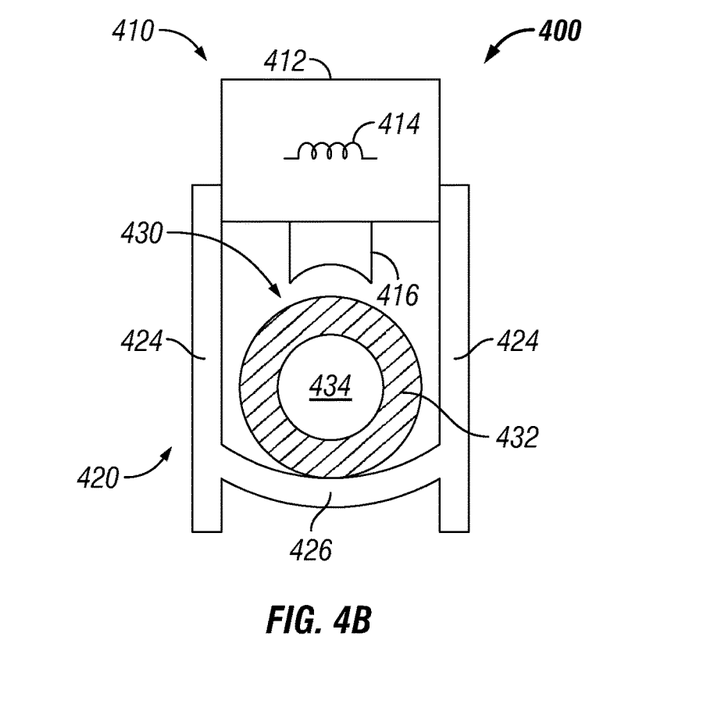
Figure 5:
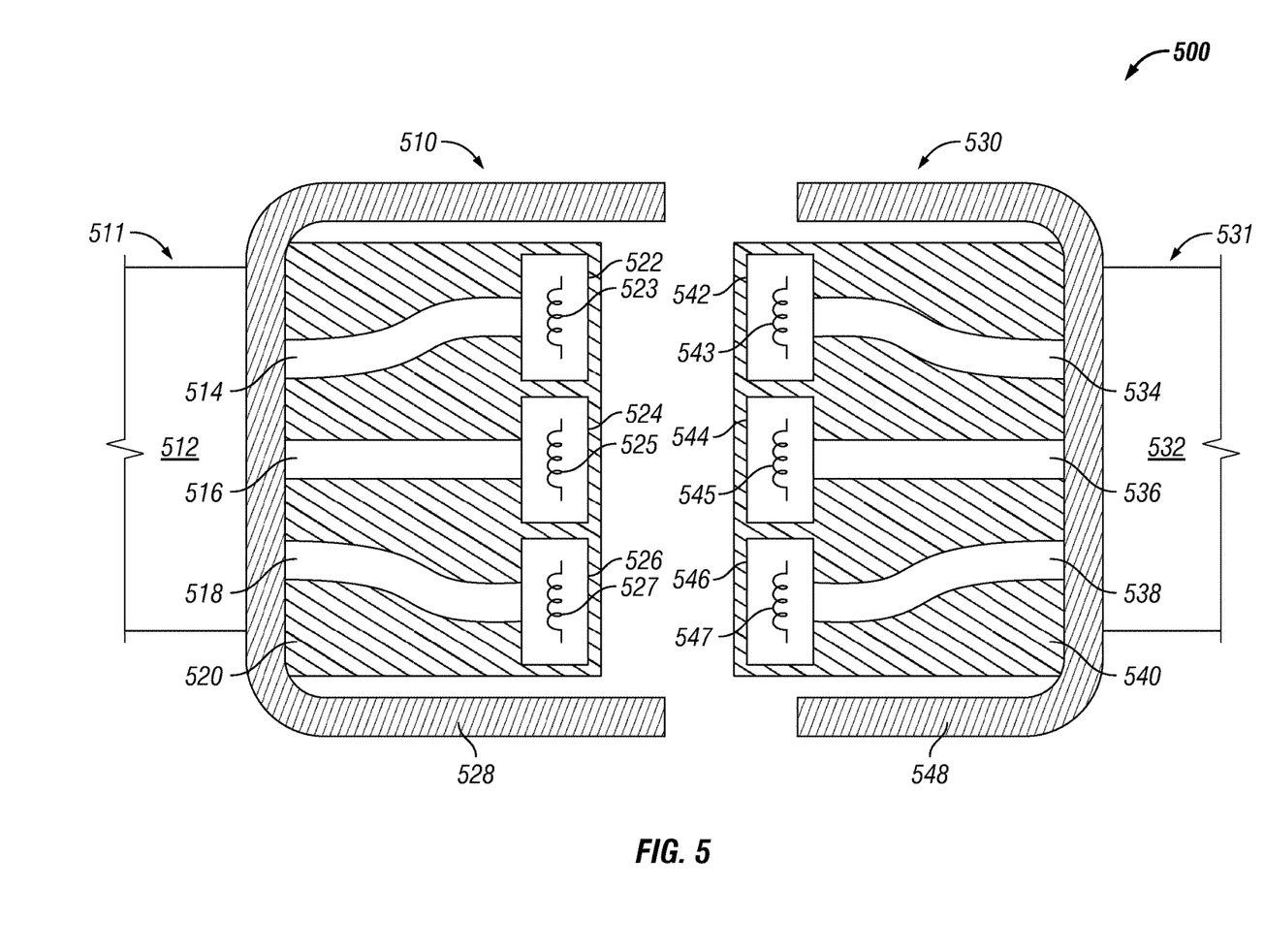
FIG. 5 shows an electrical connector using inductive power transmission in accordance with certain example embodiments.

The system 200 of FIG. 2 includes a power source 210 (substantially similar to the power source 110 described above with respect to FIG. 1) and two inductors (i.e., inductor 212 and inductor 214, also substantially similar to the inductors described above with respect to FIG. 1) that are electrically connected in series (in a "daisy chain" formation) using conductors 216, 217, 218. As shown in FIG. 2, inductor 212 is located inside of enclosure 226, and inductor 214 is located inside of enclosure 236. These components (the power source 210, the inductor 212, and the inductor 214) can be equated to the primary portion 101 described above with respect to FIG. 1. In certain example embodiments, the power source 210 can be any source of power causing current to flow through the inductor 212 and the inductor 214. Examples of such a source of power can include, but is not limited to, a cable (as shown in FIGS. 4A and 4B), an electrical connector (as shown in FIG. 5), a battery, and a 120 VAC wall outlet.

Electrical system 220 includes an inductor 222 that is positioned within an enclosure 226 and that is electromagnetically coupled to inductor 212. The electrical system 220 also includes circuitry 224 (also positioned within the enclosure 226) that is electrically connected to inductor 222 and inductor 228, inductor 240 (also positioned within the enclosure) that is electromagnetically coupled to inductor 228, and circuitry 242 (also positioned outside the enclosure) that is electrically connected to inductor 240. Similarly, electrical system 230 includes an inductor 232 that is positioned within an enclosure 236 and that is electromagnetically coupled to inductor 214. The electrical system 230 also includes circuitry 234 (also positioned within the enclosure) that is electrically connected to inductor 232 and inductor 238, inductor 250 (also positioned within the enclosure) that is electromagnetically coupled to inductor 238, and circuitry 252 (also positioned outside the enclosure) that is electrically connected to inductor 250. Each of electrical system 220 and electrical system 230 can be equated to the secondary portion 102 described above with respect to FIG. 1.

Referring to electrical system 220, while one end of the inductor 222 is electrically connected to circuitry 224, the other end of inductor 222 can be electrically connected to a different portion of the device 224, or electrically connected to some other component or device. The device 224 can include one or more of a number of electrical devices that use current and/or voltage to operate. Examples of such devices can include, but are not limited to, a VFD, a breaker, a motor starter, a switch, an air moving device, a controller, a sensor, a motor, and a protective device. Similarly, with respect to electrical system 230, while one end of the inductor 232 is electrically connected to device 234, the other end of inductor 232 can be electrically connected to a different portion of the device 234, or electrically connected to some other component or device. The device 234 can include one or more of a number of electrical devices that use current and/or voltage to operate.

Similar to the process described above with respect to FIG. 1, the power source 210 generates current that flows through conductor 216 to inductor 212. When this occurs, inductor 222, which is located proximately to inductor 212, is electromagnetically induced to generate an amount of power based on the current flowing through inductor 212. The power induced in the inductor 222 is used to power up some or all of the device 224 within the enclosure 226.

After current flows through inductor 212, the current continues to flow through conductor 217 to inductor 214. When the current flows through inductor 214, electrical system 230 can receive power induced by inductor 214. Specifically, as current flows through inductor 214, inductor 232, which is located proximately to inductor 214, is electromagnetically induced to generate an amount of power based on the current flowing through inductor 214. The power induced in the inductor 232 is used to power up some or all of the device 234 within the enclosure 236.

After current flows through inductor 214, the current continues to flow through conductor 218 to return to the power source 210, completing the electric circuit. Optionally, other inductors can be placed in series with, and/or in parallel with, inductors 212 and 214. Similarly, other electrical systems, similar to electrical systems 220 and 230, can be included in the system 200 and receive power induced by such additional inductors.

Optionally, one or both electrical systems 220 and 230 can be a source of inductive power for one or more additional devices. For example, as shown in FIG. 2, electrical system 220 includes an inductor 228 that receives power from device 224, which in this case acts as a power source for inductor 228. In such a case, inductor 240, which is located proximately to inductor 228, is electromagnetically induced to generate an amount of power based on the current flowing through inductor 228. The power induced in the inductor 240 is used to power up some or all of the device 242, which is electrically connected to inductor 240.

While one end of the inductor 228 is electrically connected to device 224, the other end of inductor 228 can be electrically connected to a different portion of the device 224, or electrically connected to some other component or device. Further, while one end of the inductor 240 is electrically connected to device 242, the other end of inductor 240 can be electrically connected to a different portion of the device 242, or electrically connected to some other component or device. The device 242 can include one or more of a number of electrical devices that use current and/or voltage to operate.

Similarly, as shown in FIG. 2, electrical system 230 includes an inductor 238 that receives power from device 234, which in this case acts as a power source for inductor 238. In such a case, inductor 250, which is located proximately to inductor 238, is electromagnetically induced to generate an amount of power based on the current flowing through inductor 238. The power induced in the inductor 250 is used to power up some or all of the device 252, which is electrically connected to inductor 250.

While one end of the inductor 238 is electrically connected to device 234, the other end of inductor 238 can be electrically connected to a different portion of the device 234, or electrically connected to some other component or device. Further, while one end of the inductor 250 is electrically connected to device 252, the other end of inductor 250 can be electrically connected to a different portion of the device 252, or electrically connected to some other component or device. The device 252 can include one or more of a number of electrical devices that use current and/or voltage to operate.

FIG. 3 shows a schematic view of a system 300 of lighting devices receiving inductive power in accordance with certain example embodiments. Specifically, the system 300 of FIG. 3 includes a power source 310, lighting device A 320, lighting device B 330, lighting device C 340, and lighting device D 350 formed in a "daisy chain" formation. In one or more embodiments, one or more of the components shown in FIG. 3 may be omitted, repeated, and/or substituted. Accordingly, embodiments of inductive power transmission should not be considered limited to the specific arrangements of components shown in FIG. 3. For example, fewer or additional lighting sources can be included in the system 300.

The power source 310 is substantially similar to the power source 110 described above with respect to FIG. 1. In addition, inductor 312, which is electrically connected to the power source 310, is positioned inside of lighting device A 320 and is substantially similar to the inductors described above with respect to FIGS. 1 and 2. Not shown (hidden from view) are three other inductors, one positioned inside of each of lighting device B 330, lighting device C 340, and lighting device D 350. The power source 310, inductor 312, and the three hidden conductors are electrically connected in series using conductors 370, 371, 372, 373, and 374. These components (the power source 310, inductor 312, and the three hidden inductors) can be equated to the primary portion 101 described above with respect to FIG. 1. Inductor 312 and the three hidden conductors can be called a transmitting inductor or a primary inductor.

Lighting device A 320 includes an inductor 322 (also called a receiving inductor or a secondary inductor) that is positioned within an enclosure 326 and that is electromagnetically coupled to inductor 312. Lighting device A 320 also includes device 324 (also positioned within the enclosure 326) that is electrically connected to inductor 322. Similarly, lighting device B 330, lighting device C 340, and lighting device D 350 each includes an inductor (hidden from view inside the enclosure), positioned within the respective enclosure (enclosure 336, enclosure 346, enclosure 356) that is electromagnetically coupled to an inductor electrically connected to the power source 310 and inductor 312, and electrically connected to device (also hidden from view inside the enclosure). Each of lighting device A 320, lighting device B 330, lighting device C 340, and lighting device D 350 can be equated to the secondary portion 102 described above with respect to FIG. 1.

Referring to lighting device A 320, while one end of the inductor 322 is electrically connected to circuitry 324, the other end of inductor 322 can be electrically connected to a different portion of the circuitry 324, or electrically connected to some other component or device. The circuitry 324 can include one or more of a number of electrical devices that use current and/or voltage to operate. Examples of such devices can include, but are not limited to, a LED driver, a controller, and a photocell sensor. The inductor and/or circuitry of lighting device B 330, lighting device C 340, and lighting device D 350 can be substantially similar to the corresponding components of lighting device A 320.

Similar to the process described above with respect to FIG. 1, the power source 310 generates current that flows through conductor 370 to inductor 312. When this occurs, inductor 322, which is located proximately to inductor 312, is electromagnetically induced to generate an amount of power based on the current flowing through inductor 312. The power induced in the inductor 322 is used to power up some or all of the circuitry 324 within the enclosure 326.

After current flows through inductor 312, the current continues to flow through conductor 371 to the transmitting inductor positioned within lighting device B 330. When the current flows through the transmitting inductor positioned within lighting device B 330, the circuitry positioned within the enclosure 336 of lighting device B 330 can receive power induced by the transmitting inductor through the electromechanically-coupled receiving inductor that is electrically connected to the circuitry of lighting device B 330. Similarly, conductor 372 is used to transmit the current flowing through the transmitting inductor positioned in lighting device B 330 to the transmitting inductor positioned in lighting device C 340. When the current flows through the transmitting inductor positioned within lighting device C 340, the circuitry positioned within the enclosure 346 of lighting device C 340 can receive power induced by the transmitting inductor through the electromechanically-coupled receiving inductor that is electrically connected to the circuitry of lighting device C 340.

Subsequently, conductor 373 is used to transmit the current flowing through the transmitting inductor positioned in lighting device C 340 to the transmitting inductor positioned in lighting device D 350. When the current flows through the transmitting inductor positioned within lighting device D 350, the circuitry positioned within the enclosure 356 of lighting device D 350 can receive power induced by the transmitting inductor through the electromechanically-coupled receiving inductor that is electrically connected to the circuitry of lighting device D 350. Finally, conductor 374 is used to transmit the current flowing through the transmitting inductor positioned in lighting device D 350 back to the power source 310.

In certain example embodiments, input voltage for certain secondary circuits is designed to compensate for voltage drop. Voltage drop can be caused by one or more of a number of factors, including but not limited to length of one or more conductors, size of one or more conductors, ambient temperature, number of secondary circuits, power usage of a secondary circuit, and material of a conductor. For example, in the lighting system of FIG. 3, the current flowing through the transmitting inductor of lighting device D 350 is less than the current flowing through the transmitting inductor of lighting device A 320. Thus, compensation may need to be made so that the circuitry of lighting device D 350 operates properly for the voltage induced in the receiving inductor of lighting device D 350.

FIGS. 4A and 4B show various views of a system 400 using an inductive device in accordance with certain example embodiments. Specifically, FIG. 4A shows a side view in partial cross-section of the system 400 as the inductive device is approaching a closed position. In addition, FIG. 4B shows a cross-sectional front view of the system 400 as the inductive device is approaching the closed position. In one or more embodiments, one or more of the components shown in FIGS. 4A and 4B may be omitted, repeated, and/or substituted. Accordingly, embodiments of inductive power transmission should not be considered limited to the specific arrangements of components shown in FIGS. 4A and 4B. For example, another device (e.g., a motor winding, a battery) can be used in place of the cable in the system 400.

Referring to FIGS. 4A and 4B, the system 400 includes the inductive device and a cable 430. The cable 430 can be any device through which current flows. In this example, the cable 430 includes a conductor 434 that is disposed within (surrounded by) insulating member 432. The conductor 434 can be made of one or more of a number of electrically conductive materials, including but not limited to copper and aluminum. The conductor 434 can be one or more of a number of sizes (e.g., 10 American wire gauge (AWG), 12 AWG, 16 AWG). The conductor 434 can be a single conductor or one of a number of conductors (strands) within the insulating member 432.

The insulating member 432 of the cable 430 can be made of one or more of a number of electrically non-conductive materials, including but not limited to rubber and plastic. In certain example embodiments, the insulating member 432 is made of such material as to allow the encroacher 416 (described below) to penetrate (e.g., strip, pierce) at least a portion of the insulating member 432 in order to make physical contact with the conductor 434. The insulating member 432 that surrounds the conductor 434 can be of any thickness. Further, the thickness of the insulating member 432 can be substantially uniform along the length and/or perimeter of the insulating member 432.

The inductive device can include a housing 410 and a latch assembly 420. The housing 410 can include at least one wall 412 that forms a cavity. Inside of the cavity of the housing 410 can be disposed a receiving inductor 414. The receiving inductor 414 can be electrically connected to any circuitry and/or device positioned inside of and/or outside of the housing 410, where such circuitry and/or device can be substantially similar to those described above with respect to FIGS. 2 and 3. The wall 412 can be made of one or more of a number of suitable materials, including but not limited to plastic, steel, aluminum, and rubber.

In certain example embodiments, the housing 410 of the inductive device also includes a encroacher 416 disposed on the outer surface of the wall 412. The encroacher 416 can be any device or component that can physically contact the conductor 434 through the insulating member 432. The encroacher 416 can contact the conductor 434 in one or more of a number of ways. For example, the encroacher 416 can strip away the insulating member 432. As another example, the encroacher 416 can stab through the insulating member 432.

The encroacher 416 can be positioned in such a location on the outer surface of the wall 412 that allows the encroacher 416 to contact the insulating member 432 of the cable 430. In this example, the encroacher 416 is disposed on the bottom side of the housing 410. The encroacher 416 can have at least one sharpened edge 417 that is shaped and sized in such a way as to penetrate the insulating member 432 of the cable 430. The encroacher 416 may penetrate part of the thickness of the insulating member 432 or all of the thickness of the insulating member 432. In the latter case, the encroacher 416 can contact the conductor 434 of the cable 430.

In order for the encroacher 416 to penetrate the insulating member 432, the encroacher 416 can be made of one or more of a number of suitable materials, including but not limited to stainless steel and aluminum. In certain example embodiments, the encroacher 416 can be made of an electrically conductive material. The encroacher 416 can form a single piece with the wall 412 (as from a mold), or the encroacher 416 can be a separate piece coupled to the wall 412. In the latter case, the encroacher 416 can be mechanically coupled to the wall 412 in one or more of a number of ways, including but not limited to fixedly, slidably, removably, and detachably. The encroacher 416 can be mechanically coupled to the wall 412 using one or more of a number of coupling methods, including but not limited to welding, epoxy, fastening devices (e.g., screws, nuts), and mating threads.

In certain example embodiments, the housing 410 of the inductive device also includes a coupling feature 418 disposed on the outer surface of the wall 412. The coupling feature 418 can be one or more of a number of features that can be used to couple part of the latch assembly 420 to the housing 410, as described below. The coupling feature 418 can be any of a number of features, including but not limited to a protrusion, an aperture, a slot, a mating thread, and a slotted cap. In this example, the coupling feature 418 is a protrusion that extends away from the back side of the wall 412 toward the bottom of the housing 410.

The coupling feature 418 can be made of one or more of a number of suitable materials, including but not limited to plastic, stainless steel, and aluminum. The coupling feature 418 can form a single piece with the wall 412 (as from a mold), or the coupling feature 418 can be a separate piece coupled to the wall 412. In the latter case, the coupling feature 418 can be mechanically coupled to the wall 412 in one or more of a number of ways, including but not limited to fixedly, slidably, removably, and detachably. The coupling feature 418 can be mechanically coupled to the wall 412 using one or more of a number of coupling methods, including but not limited to welding, epoxy, fastening devices (e.g., screws, nuts), and mating threads.

In certain example embodiments, the latch assembly 420 of the inductive device includes an arm 424, a harness 426, and a latch 428. The latch assembly 420 can be movably coupled to the housing 410 using the arm 424. The arm 424 can have a length and can have one or more of a number of segments. For example, as shown in FIGS. 4A and 4B, the arm 424 has two segments, one positioned on each side of the harness 426 and the housing 410. The arm 424 of the latch assembly 420 can be movably (e.g., hingedly, slidably) coupled to the housing 410 in one or more of a number of ways. In this example, a pin 422 protrudes through an aperture in the proximal end of the arm 424 (or in each segment of the arm 424) as well as an aperture through part or all of the wall 412 in the housing 410. In such a case, the arm 424 becomes hingedly coupled to the housing 410 and rotates about the pin 422. In addition, or in the alternative, one or more other features can be disposed on the wall 412 and/or the arm 424 to allow the housing 410 to become moveably coupled to the latch assembly 420.

In certain example embodiments, the harness 426 couples to the insulating member 432 of the cable 410. Specifically, the harness 426 provides leverage so that the encroacher 418, positioned on substantially the opposite side of the cable 430, can more easily penetrate the insulating member 432 of the cable 430. Further, the harness 426 can be used to secure the inductive device to the cable 430 when the latch 428 is mechanically coupled to the coupling feature 418.

The harness 426 can have dimensions (e.g., thickness, width, length, curvature) suitable for securing the cable 430. If the arm 424 has multiple segments, then the harness 426 can be mechanically coupled to all or some of such segments. For example, as shown in FIGS. 4A and 4B, the harness 426 is mechanically coupled at one end one segment of the arm 424 and at the other end to the other segment of the arm 424. The harness 426 can be mechanically coupled to the arm 424 at any point (or, if there are multiple harnesses 426, at any points) along the arm 424. For example, as shown in FIG. 4A, the harness 426 is coupled to the arm 424 toward the distal end of the arm 424. In addition, the harness 426 can extend away from the arm 424 in one or more directions. In this case, as shown in FIG. 4A, the harness 426 extends radially outward from the arm 424.

In certain example embodiments, the harness 426 and/or the arm 424 include one or more features that help secure the latch assembly 420 to the cable 430. For example, the segments of the arm 424 can have angled spikes along the interior-facing outer surface of the arm 424, where the angled spikes can penetrate at least a portion of the thickness of the insulating member 432.

In certain example embodiments, the latch 428 mechanically couples to the coupling feature 418 of the housing 410. The latch 428 can be of any shape and/or size suitable to mechanically couple to the coupling feature 418. In this example, as shown in FIG. 4A, the latch 428 includes a notch 429 that protrudes in such a manner as to allow the notch 429 on the latch 428 to fit over the top of the coupling feature 418 (in this case, a protrusion) and secure the latch assembly 420 to the housing 410. The latch 428 can be one or more features disposed on the arm 424. The latch 428 can be located at any of a number of points along the length of the arm 424. In this example, the latch 428 is a protruding element that extends radially inward (i.e., toward the bottom side of the cable 430 when the cable 430 is positioned between the arm 424, the harness 426, and the housing 410) from the arm 424 at the distal end of the arm 424.

The components (e.g., arm 424, harness 426, latch 428) of the latch assembly 420 can be made from one or more of a number of materials, including but not limited to plastic, metal, and rubber. The latch assembly 420 can be made from a single piece (as from a mold) or can be made of multiple pieces that are mechanically coupled to each other in one or more of a number of ways, including but not limited to fixedly, slidably, removably, and detachably. In such a case, the multiple pieces of the latch assembly 420 can be mechanically coupled to each other using one or more of a number of coupling methods, including but not limited to welding, epoxy, fastening devices (e.g., screws, nuts), and mating threads.

FIG. 5 shows an electrical connector 500 using inductive power transmission in accordance with certain example embodiments. In one or more embodiments, one or more of the components shown in FIG. 5 may be omitted, repeated, and/or substituted. Accordingly, embodiments of an electrical connector using inductive power transmission should not be considered limited to the specific arrangements of components shown in FIG. 5.

Referring to FIGS. 4 and 5, the electrical connector 500 includes a first connector end 510 (e.g., a male connector end) and a second connector end 530 (e.g., a female connector end). The first connector end 510 includes a sleeve 528 that has an open end and forms a cavity. The sleeve 528 acts as a type of housing for the other components of the first connector end 510, described below. The sleeve 528 can be rigid and/or flexible. The sleeve 528 can be made of one or more of a number of materials, including but not limited to rubber, plastic, and metal.

Inside of the cavity can be disposed an insulator 520. In certain example embodiments, the insulator 520 physically separates each of the conductors (described below) and the associated inductive devices from the other conductors and associated inductive devices that are positioned within the cavity. The insulator 520 can be rigid or slightly flexible. In the latter case, the channels formed within the insulator 520 and through which the conductors and associated inductive devices are disposed substantially maintain their integrity with respect to each other so that the channels do not make contact with each other. The insulator 520 can be made of one more of a number of materials, including but not limited to rubber, nylon, plastic, foam, and silicon. In certain example embodiments, the insulator 520 is made of electrically non-conductive material.

The insulator 520 can fill any portion or all of the cavity formed by the sleeve 528. For example, as shown in FIG. 5, the insulator 520 can make contact with a back portion of the sleeve 528, but not contact the sides of the sleeve 528. In addition, the insulator 520 can be recessed within the sleeve 528 (as shown in FIG. 5), can extend to substantially the end of the sleeve 528 (where the open end is located), or can extend beyond the end of the sleeve 528 (as shown with the insulator 540 of the second connector end 530 in FIG. 5).

One or more conductors can be positioned within one or more channels of the insulator 520. For example, as shown in FIG. 5, there are three conductors (i.e., conductor 514, conductor 516, and conductor 518) positioned within the insulator 520 of the first connector end 510. The conductors can be part of a cable 511 that is mechanically coupled to the sleeve 528. The cable 511 can include an insulating member 512. The conductor and insulating member 512 of the cable can be substantially similar to the conductor 434 and insulating member 432 of the cable 430 described above with respect to FIGS. 4A and 4B.

In certain example embodiments, the distal end of each conductor is electrically connected to an inductive device. For example, in this case, the distal ends of conductor 514, conductor 516, and conductor 518 are electrically connected to a separate inductive device. Each inductive device can include a housing and a transmitting inductor. For example, as shown in FIG. 5 the inductive device electrically connected to conductor 514 includes a housing 522 that houses a transmitting inductor 523. The inductive device electrically connected to conductor 516 includes a housing 524 that houses a transmitting inductor 525. The inductive device electrically connected to conductor 518 includes a housing 526 that houses a transmitting inductor 527. Each inductive device can be substantially similar to, or different from, the other inductive devices in the first connector end 510.

As a result of a conductor being electrically connected to an inductive device, when current flows through the inductor (e.g., inductor 514), then current also flows through the associated transmitting inductor (e.g., transmitting inductor 523) of the inductive device. In certain example embodiments, one or more of the inductive devices are surrounded by the insulator 520. In other words, the insulator may prevent the inductive devices from being physically exposed to ambient air. Further, the insulator 520 maintains a physical separation from each of the inductive devices of the first connector end 510.

The components of the second connector end 530 are substantially the same as the corresponding components of the first connector end 510. The second connector end 530 of FIG. 5 includes a sleeve 548 that forms a cavity. Disposed within this cavity are three conductors (conductor 534, conductor 536, and conductor 538) and associated inductive devices that are physically separated from each other by an insulator 540. In this case, the inductive devices of the second connector end 530 include a receiving inductor within the housing. Specifically, the inductive device electrically connected to the distal end of conductor 534 includes receiving inductor 543 positioned within housing 542. The inductive device electrically connected to the distal end of conductor 536 includes receiving inductor 545 positioned within housing 544. The inductive device electrically connected to the distal end of conductor 538 includes receiving inductor 547 positioned within housing 546.

As mentioned previously, the insulator 520 of the first connector end 510 is recessed within the sleeve 528, and the insulator 540 of the first connector end 530 extends beyond the end of the sleeve 548. The inductive devices of the first connector end 510 and the second connector end 530 are positioned proximate to the open end of the sleeve 528 and the open end of the sleeve 548, respectively. When the first connector end 510 is mechanically coupled to the second connector end 530, the inductive devices of the first connector end 510 are positioned proximately to the corresponding inductive devices of the second connector end 530.

For example, as shown in FIG. 5, the transmitting inductor 522 of the first connector end 510 is positioned proximately to (abuts against) the receiving inductor 542 of the second connector end 530. When this occurs, and when current flows through the conductor 514, current is induced in the receiving inductor 542 because the receiving inductor 542, located proximately to the transmitting inductor 522, is electromagnetically coupled to the transmitting inductor 522. Thus, the current induced in the receiving inductor 542 flows through conductor 534 and on to whatever device and/or circuit the cable 532 is electrically connected.

As with any example embodiments of inductive power transmission described herein, the distance between a transmitting inductor (e.g., transmitting inductor 522) and a receiving inductor (e.g., receiving inductor 542) can vary based on one or more of a number of factors. Such factors can include, but are not limited to, the material (e.g., copper, aluminum) of each inductor, the power requirements of the load fed by the receiving inductor, the temperature and humidity of the environment in which the inductors are located, and the size of each inductor.

In certain example embodiments, the sleeve 528 and/or the sleeve 548 include one or more coupling features. Specifically the sleeve 528 can include a coupling feature, and the sleeve 548 can include a coupling feature that complements the coupling feature of the sleeve 528. In such a case, the coupling features can fasten (mechanically couple) the sleeve 528 of the first connector end 510 to the sleeve 548 of the second connector end 530. Examples of such coupling features can include, but are not limited to, clips, protrusions, fastening devices, apertures, slots, and mating threads. The coupling features can be positioned at any location on the connector ends, such as the outer surface, along the open end, and along an inner surface.

Example electrical connectors using inductive power, such as the electrical connector 500, have several advantages. For one, the amount of force used to mechanically couple the first connector end 510 to the second connector end 530 can be extremely low. In other words, because the electrical connector 500 does not require the mating of conductor pins and pin receivers, as is found in electrical connectors known in the art. The only mechanical mating of the connector ends in the electrical connector 500 is inserting the protruding insulator 540 of the second connector end 540 into the space left between the retracted insulator 520 and the sleeve 528 of the first connector end 510.

Another advantage is that coupling and decoupling (insertion and removal) of the first connector end 510 and the second connector end 530 results in little to no mechanical wear of the connector ends and their components (e.g., insulator 520, receiving inductor 544). Because there is little or no mechanical wear of the connector ends of the example electrical connector 500, the electrical connector 500 can function for longer periods of time without the need to replace, maintain, and/or repair the electrical connector 500.

In addition, or in the alternative, the use of example inductive power transmission systems, methods, and/or devices described herein provide other advantages. For example, example inductive power transmission systems, methods, and/or devices can be used in a "daisy chain" formation to have a single source of power (e.g., a battery, a conductor) provide power, through an electromagnetic coupling with example inductive devices, to other circuits and/or devices. By using inductive power transmission, power can be provided to one or more of a number of circuits and/or devices (including other transmitting inductors) using an existing infrastructure and without the need for additional sources of power. Thus, a single conductor and/or a single piece of equipment can be used to provide power to one or more of a number of circuits and/or devices without terminating at each circuit and/or device.

Example embodiments also reduce or eliminate temperature rise in electrical connectors and/or connections that result from hard terminations of conductors to provide power to various circuits and/or devices. In other words, by using inductive power transmission, terminations of conductors can be reduced or eliminated, which reduces the likelihood of failure of an electrical connection caused by one or more of a number of factors, including but not limited to corrosion, overheating, mechanical wear, mechanical strain, and vibration. Thus, because temperature rise in electrical connectors and/or connections is reduced or eliminated, costs related to labor, materials, time, lost opportunity, and/or other similar considerations can be reduced or eliminated.

Example embodiments also improve safety for electrical systems. For example, terminations that fail can cause a fault and/or other adverse electrical operating condition. Such conditions can lead to dangerous conditions such as an explosion. In such a case, by using example embodiments, explosions and other adverse operating conditions can be reduced or avoided. Thus, injuries to users can be reduced and/or eliminated. In addition, the operating integrity of equipment in an electrical system using example embodiments can be increased.

Accordingly, many modifications and other embodiments set forth herein will come to mind to one skilled in the art to which inductive power transmission for electrical devices pertain having the benefit of the teachings presented in the foregoing descriptions and the associated drawings. Therefore, it is to be understood that inductive power transmission for electrical devices are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. An electrical connector, comprising:
a first connector end comprising:
a first sleeve that forms a first cavity with a first open end;
a first insulator disposed within the first cavity;
a plurality of first conductors positioned within the first insulator; and
a plurality of transmitting inductors coupled to a distal end of the plurality of first conductors, wherein the plurality of transmitting inductors are positioned proximate to the first open end of the first sleeve; and
a second connector end mechanically coupled to the first connector end and comprising:
a second sleeve that forms a second cavity with a second open end;
a second insulator disposed within the second cavity;
a plurality of second conductors positioned within the second insulator; and
a plurality of receiving inductors coupled to a distal end of the plurality of second conductors, wherein the plurality of receiving inductors are positioned proximate to the second open end of the second sleeve,
wherein the plurality of transmitting inductors and the plurality of receiving inductors are disposed proximate to each other when the first connector end is mechanically coupled to the second connector end,
wherein the plurality of second conductors are configured to be coupled to at least one electrical device at their proximal end, wherein the at least one electrical device operates on multi-phase power induced through the plurality of receiving inductors.

2. The electrical connector of claim 1, wherein the first open end and the second open end abut against each other when the first connector end is mechanically coupled to the second connector end.

3. The electrical connector of claim 1, wherein the first plurality of conductors are part of a first electrical cable, and wherein the second plurality of conductors are part of a second electrical cable.

4. The electrical connector of claim 1, wherein coupling and decoupling of the first connector end from the second connector end causes substantially no mechanical wear on the first connector end and the second connector end.

5. The electrical connector of claim 1, wherein the first insulator is recessed within the first sleeve, and wherein the second insulator extends beyond the second sleeve.

6. The electrical connector of claim 1, wherein the second insulator of the second connector end is inserted into the first sleeve of the first connector end by hand without use of tools.

7. The electrical connector of claim 1, wherein the first sleeve comprises a first coupling feature, and wherein the second sleeve comprises a second coupling feature, wherein the first coupling feature and the second coupling feature couple to each other to fasten the first connector end to the second connector end.

8. The electrical connector of claim 7, wherein the first coupling feature and the second coupling feature comprise mating threads.

9. A system comprising:
a power source that generates a first current;
an electrical connector electrically coupled to the power source, wherein the electrical connector comprises:
a first connector end comprising:
a first sleeve that forms a first cavity with a first open end;
a first insulator disposed within the first cavity;
at least one first conductor positioned within the first insulator, wherein the first current flows through the at least one first conductor; and
at least one transmitting inductor coupled to the at least one first conductor, wherein the first current further flows through the at least one transmitting inductor, wherein the at least one transmitting inductor is positioned proximate to the first open end of the first sleeve; and
a second connector end mechanically coupled to the first connector end and comprising:
a second sleeve that forms a second cavity with a second open end;
a second insulator disposed within the second cavity;
at least one receiving inductor disposed within the second insulator proximate to the second open end of the second sleeve, wherein the first current flowing through the at least one transmitting inductor induces a second current to flow through the at least one receiving inductor; and
at least one second conductor coupled to the at least one receiving inductor, wherein the second current flows from the at least one receiving inductor through the at least one second conductor; and
a device electrically coupled to the at least one second conductor, wherein the second current flows through the device to provide power to the device,
wherein the at least one transmitting inductor and the at least one receiving inductor are disposed proximate to each other when the first connector end is mechanically coupled to the second connector end,
wherein the first connector end and the second connector end are separable from each other,
wherein the device is maintainable without interrupting the power source by separating the first connector end from the second connector end.

10. The system of claim 9, wherein the electrical connector is located in a hazardous environment.

11. The system of claim 10, wherein the electrical connector is disposed within an explosion-proof enclosure that complies with applicable National Electrical Manufacturers Association standards.

12. The system of claim 11, wherein generation of the second current induced in the receiving inductor and used to power the device prevents a condition that causes an explosion in the hazardous environment.

13. The system of claim 12, wherein decoupling the first connector end from the second connector end can safely be done when the first current is flowing through the at least one transmitting inductor.

14. The system of claim 9, further comprising:
an additional transmitting inductor electrically connected to the device, wherein the second current received by the device from the at least one receiving inductor of the electrical connector flows through the additional transmitting inductor;
an additional receiving inductor positioned proximate to the additional transmitting inductor, wherein the second current flowing through the additional transmitting inductor induces a third current to flow through the additional receiving inductor; and
an additional device electrically connected to the additional receiving inductor, wherein the third current induced in the additional receiving conductor powers the additional device.

15. The system of claim 14, wherein the additional receiving inductor and the additional transmitting inductor are part of an additional electrical connector.

16. The system of claim 14, wherein the at least one receiving inductor and the at least one transmitting inductor are disposed within a first electrical enclosure, and wherein the additional receiving inductor and the additional transmitting inductor are disposed within a second electrical enclosure.

17. The system of claim 9, further comprising:
an additional transmitting inductor electrically connected to the at least one transmitting inductor of the electrical connector, wherein the first current that flows through the at least one transmitting inductor of the electrical connector subsequently flows through the additional transmitting inductor;
an additional receiving inductor positioned proximate to the additional transmitting inductor, wherein the first current flowing through the additional transmitting inductor induces a third current to flow through the additional receiving inductor; and
an additional device electrically connected to the additional receiving inductor, wherein the third current induced in the additional receiving conductor powers the additional device.

18. The system of claim 17, wherein the additional receiving inductor and the additional transmitting inductor are part of an additional electrical connector.

19. The system of claim 17, wherein the at least one receiving inductor and the at least one transmitting inductor are disposed within a first electrical enclosure, and wherein the additional receiving inductor and the additional transmitting inductor are disposed within a second electrical enclosure.

20. A system comprising:
a power source that generates a first current having a first phase and a second phase;
an electrical connector electrically coupled to the power source, wherein the electrical connector comprises:
a first connector end comprising:
a first sleeve that forms a first cavity with a first open end;
a first insulator disposed within the first cavity;
a first conductor positioned within the first insulator, wherein the first phase of the first current flows through the first conductor;
a second conductor positioned within the first insulator, wherein the second phase of the first current flows through the second conductor;
a first transmitting inductor coupled to the first conductor, wherein the first phase of the first current further flows through the first transmitting inductor, wherein the first transmitting inductor is positioned proximate to the first open end of the first sleeve;
a second transmitting inductor coupled to the second conductor, wherein the second phase of the first current further flows through the second transmitting inductor, wherein the second transmitting inductor is positioned proximate to the first open end of the first sleeve; and
a second connector end mechanically coupled to the first connector end and comprising:
a second sleeve that forms a second cavity with a second open end;
a second insulator disposed within the second cavity;
a first receiving inductor disposed within the second insulator proximate to the second open end of the second sleeve, wherein the first phase of the first current flowing through the first transmitting inductor induces a first phase of a second current to flow through the first receiving inductor;
a second receiving inductor disposed within the second insulator proximate to the second open end of the second sleeve, wherein the second phase of the first current flowing through the second transmitting inductor induces a second phase of the second current to flow through the second receiving inductor;
a third conductor coupled to the first receiving inductor, wherein the first phase of the second current flows through the third conductor; and
a fourth conductor coupled to the second receiving inductor, wherein the second phase of the second current flows through the fourth conductor; and
at least one device electrically coupled to the third conductor and the fourth conductor, wherein the first phase and the second phase of the second current flows through the at least one device to provide power to the at least one device,
wherein the first transmitting inductor and the first receiving inductor are disposed proximate to each other when the first connector end is mechanically coupled to the second connector end,
wherein the second transmitting inductor and the second receiving inductor are disposed proximate to each other when the first connector end is mechanically coupled to the second connector end,
wherein the first connector end and the second connector end are separable from each other.

* * * * *